United States Patent [19]

Seeger

[11] Patent Number: 4,471,420
[45] Date of Patent: Sep. 11, 1984

[54] PROTECTION CIRCUIT FOR THYRISTORS IN AN INVERTER IN RAIL-BOUND VEHICLES

[75] Inventor: Herbert Seeger, Essen, Fed. Rep. of Germany

[73] Assignee: Fried. Krupp Gesellschaft mit beschränkter Haftung, Essen, Fed. Rep. of Germany

[21] Appl. No.: 385,283

[22] Filed: Jun. 4, 1982

[30] Foreign Application Priority Data

Jun. 6, 1981 [EP] European Pat. Off. ............ 81104387

[51] Int. Cl.³ .......................................... H02H 7/125
[52] U.S. Cl. ...................................... 363/54; 363/49; 363/139; 361/89
[58] Field of Search ...................... 363/27-28, 363/37, 49, 54, 57-58, 135, 139; 361/89, 82-84, 195; 307/252 R, 252 N, 252 P, 252 Q, 252 J, 252 K

[56] References Cited

U.S. PATENT DOCUMENTS

| | | | |
|---|---|---|---|
| 3,678,335 | 7/1972 | Pucher | 361/89 X |
| 3,973,144 | 8/1976 | Piccone | 307/252 Q |
| 4,161,773 | 7/1979 | Szpakowski | 363/49 |

FOREIGN PATENT DOCUMENTS

| | | |
|---|---|---|
| 24448 | 3/1981 | European Pat. Off. . |
| 2449548 | 4/1975 | Fed. Rep. of Germany . |
| 2292606 | 6/1976 | France . |

OTHER PUBLICATIONS

*Thyristoren*, By K. Heumann et al., Teubner (Stuttgart, W. Germany), 3rd Ed., 1974, pp. 41, 47 and 242.

Primary Examiner—Peter S. Wong
Attorney, Agent, or Firm—Spencer & Frank

[57] ABSTRACT

In a protective circuit for the thyristors of an inverter circuit in a rail-bound vehicle, RC-R members are connected in parallel with the individual thyristors in order to prevent undue reverse voltages and a fuse is provided to cut off excess currents.

In order to reduce the dimensions of the thyristors the series connection of a resistor and a decoupling blocking diode is connected in parallel with each thyristor. The respective center points of these components are connected, via a breakdown diode, with the control grid of the respective thyristor, so that the secondary voltage of the inverter circuit is reduced when there is a malfunction due to excess reverse voltage and the inverter circuit is disconnected from the rail-road mains.

6 Claims, 3 Drawing Figures

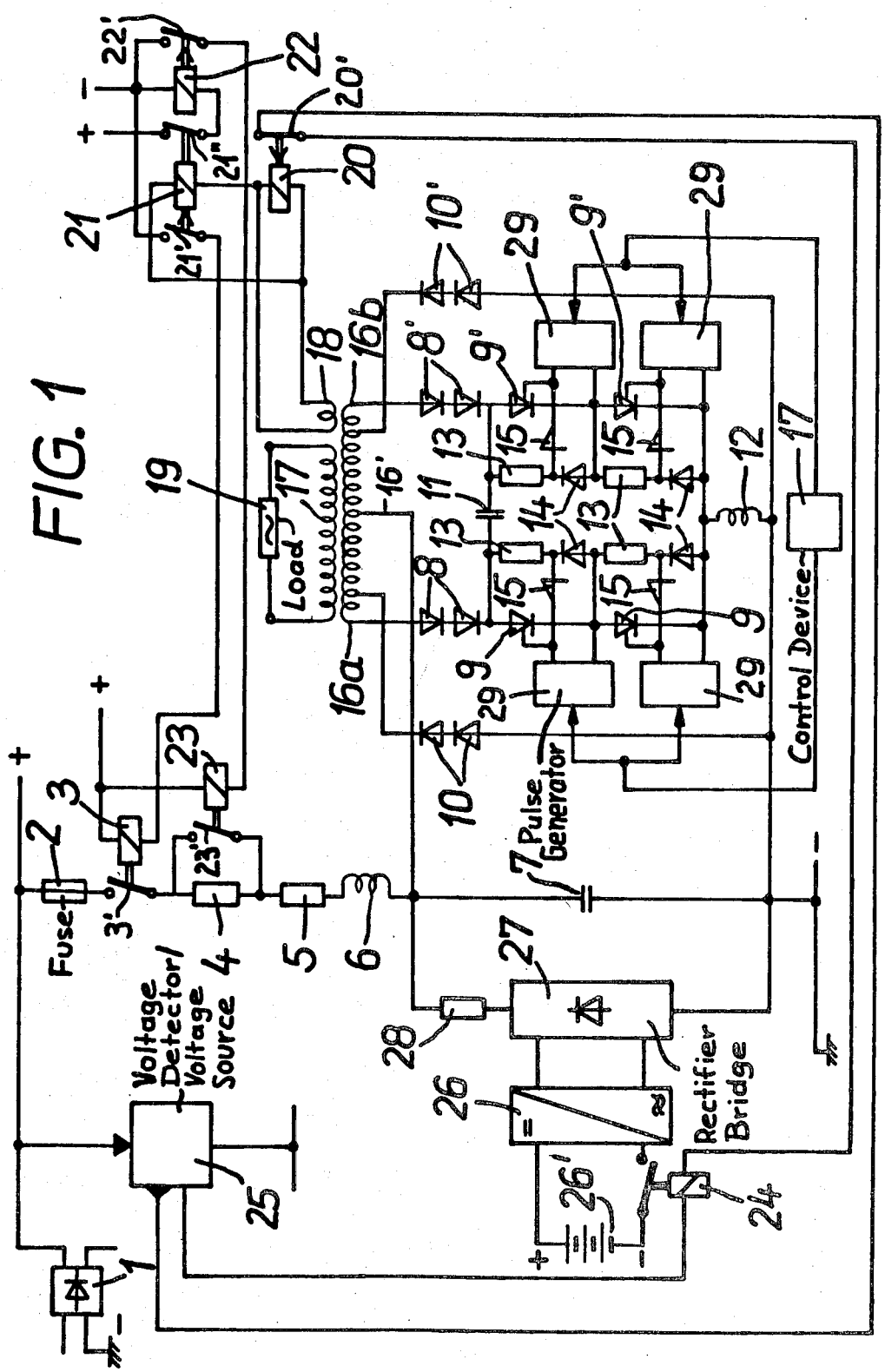

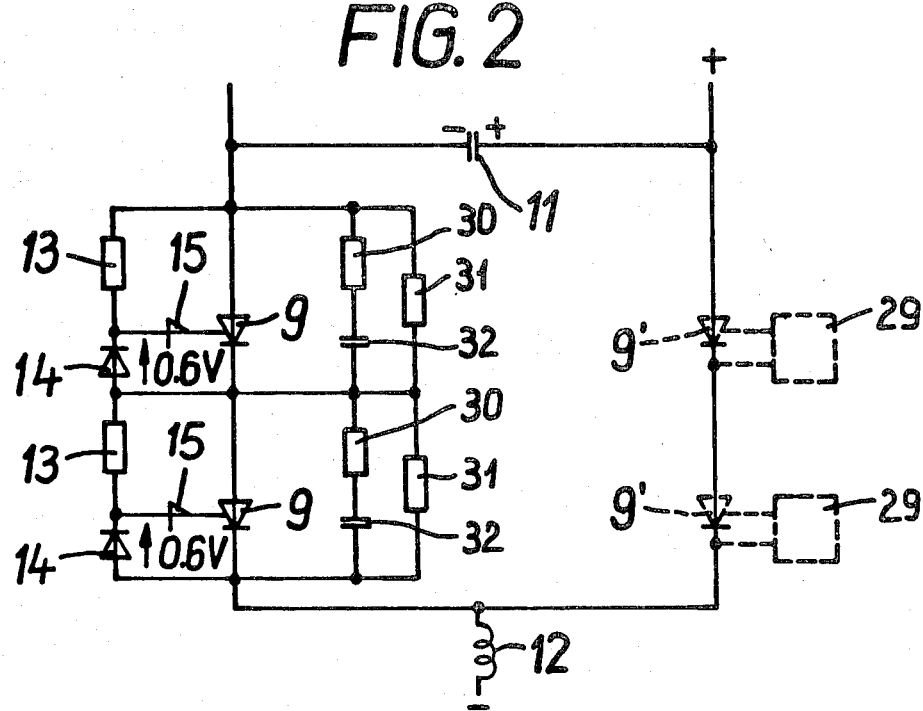
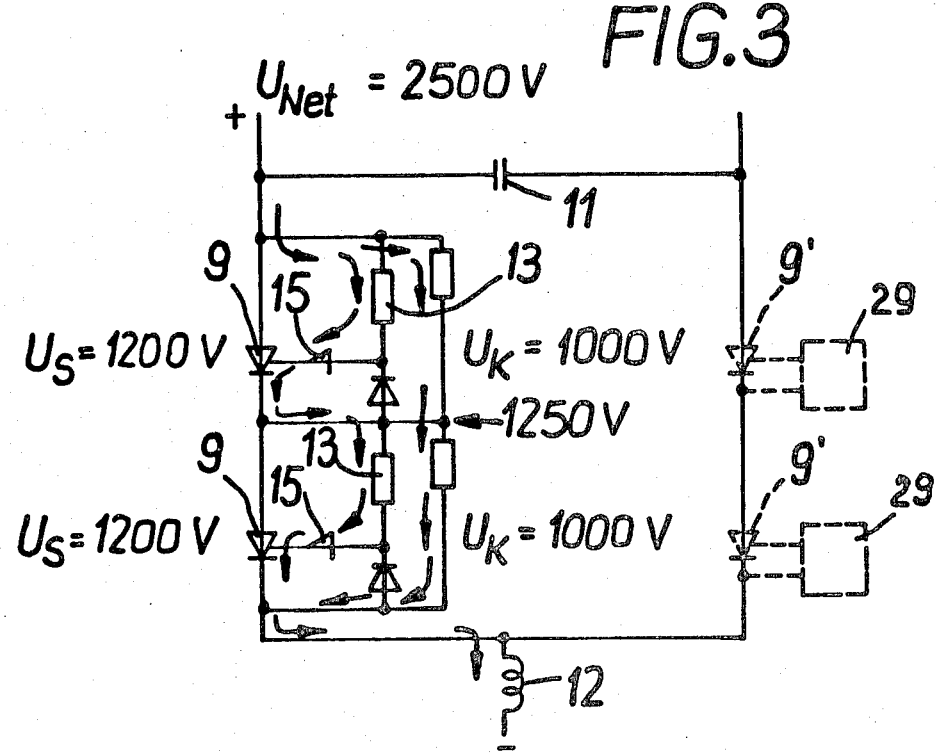

4,471,420

PROTECTION CIRCUIT FOR THYRISTORS IN AN INVERTER IN RAIL-BOUND VEHICLES

BACKGROUND OF THE INVENTION

The present invention relates to a device for supplying energy from a railroad mains producing alternating or direct voltages at different levels to loads in a rail-bound vehicle. More particularly, the present invention relates to such a device including a static inverter equipped with thyristors and preceded by a rectifier, each thyristor of the inverter being equipped with an excess inverse voltage protection circuit (CR-R member) with the normally open contact of a relay being connected ahead of the inverter.

It is known to limit the inverse voltage of the thyristors of an inverter by equipping each of the thyristors with a CR-R member — shown in FIG. 2 of the accompanied drawing and formed by capacitors 30, 31, 32— and to connect a filter comprising a coil and a capacitor ahead of the inverter— choke 6 and capacitor 7 in FIG. 1. This design has been state of the art for many years as can be seen from the illustrations on pp. 41, 47, and 272, Figures 41.1, 47.1, and 272.1 of the book "Thyristoren" by K. Heumann, C. Stumpe published by Teubner, Stuttgart, West Germany, 3rd Ed., 1974.

In such a protective circuit, it may happen that upon the occurrence of a rapid succession of a plurality of mains voltage peaks, the mains caused inverse voltage across the thyristors rises considerably so that the thyristors — unless they have been overdimensioned— are destroyed. If, however, a fuse or circuit breaker in the form of an overvoltage protector is connected ahead of the inverter, such a fuse would have to be changed very often.

SUMMARY OF THE INVENTION

It is the object of the present invention to provide a protective circuit for the thyristors of an inverter circuit of the above type in which the thyristors need be designed only for rated operation.

The above object is achieved according to the present invention in that in a circuit arrangement including a thyristor static inverter circuit having an ouput transformer and with each thyristor of the reverter circuit being equipped with a respective parallelly connected excess inverse voltage protection circuit, and a rectifier circuit and the normally open contact of a first relay connected between the input to the circuit arrangement and the input of the inverter circuit; each thyristor is provided with the series connection of a resistor and a decoupling blocking diode connected in parallel with the respective excess reverse voltage protection circuit (RC-R member), the anode of each decoupling blocking diode is connected with the cathode of the associated thyristor and the control grid of each thyristor is connected with the cathode of the associated thyristor via a respective breakdown diode which is disposed in the breakdown direction with respect to control grid of the associated thyristor, and a voltage sensor, which senses the secondary voltage of the inverter transformer, is connected to the coil of the first relay and de-energizes the first relay, thus separating the inverter circuit from the railroad mains, if there is a break or collapse of the secondary voltage.

The advantages realized by the invention are essentially that the mains caused inverse voltage is limited so that the thyristors need not be overdimensioned. Moreover, any fuse connected ahead of the inverter circuit would not be tripped if there was an excess voltage.

According to a further feature of the invention, the voltage sensor may be realized in a very simple manner, e.g. by a relay.

According to another feature of the invention, the start-up current of the inverter circuit is limited by means of a start-up resistor selectively connected ahead of the inverter circuit so that the thyristors again need be designed only for rated operation.

Finally, according to a still further feature of the invention, the inverter circuit, after the secondary of its transformer has been short-circuited, can be returned to operation and the rated current intensity of the thyristors is not exceeded.

BRIEF DESCRIPTION OF THE DRAWINGS

FIG. 1 is a circuit diagram for an energy supply device including an inverter circuit according to a preferred embodiment of the invention.

FIG. 2 is the circuit diagram for an inverter circuit according to the invention during a commutation process.

FIG. 3 is a circuit diagram for an inverter circuit according to the invention during a mains voltage surge.

DETAILED DESCRIPTION OF THE PREFERRED EMBODIMENT

Turning now to FIG. 1, there is shown an energy supply device for a rail-bound vechicle which includes, at its input, a rectifier device 1 whose input is connected to the railroad mains which supplies alternating current. Connected across the output of the rectifier device 1 is a series circuit including, in sequence, a fuse 2, the normally open contact 3' of a relay 3, a start-up resistor 4, a current limiting resistor 5, an attenuating choke 6 and an attenuation or energy storage capacitor 7.

The inverter circuit is connected to the capacitor 7 in a center point connection. This inverter circuit includes two rows of blocking diodes 8 and 8', two rows of thyristors 9 and 9' and two rows of idling diodes 10 and 10', a commutation capacitor 11, a commutation choke 12 and a transformer 16-18. Each of the four thyristors 9 and 9' of the inverter circuit is connected in parallel with the series connection of a resistor 13 and a decoupling blocking diode 14 with one end of each resistor 13 being connected with the anode of the corresponding thyristor 9 or 9' and the anode of the respective decoupling blocking diode 14 being connected with the cathode of the corresponding thyristor 9 or 9'. A respective sweep or breakdown diode 15, e.g. an break over type of avalanche diode, is connected, in the breakdown direction, between the cathode of the associated decoupling blocking diode 14 and the control grid of the corresponding thyristor 9 or 9'. In a conventional manner, the thyristors 9 and 9' are each also in communication with a respective pulse generator device 29 which produces the required pulses to actuate the thyristors. All of these pulse generator devices 29 are controlled by a control device 17.

The inverter transformer includes a primary winding having a center tap 16' so as to form two partial or half windings 16a, 16b. The center tap 16' of the inverter transformer is connected to the junction of the attenuation choke 6 and the capacitor 7. The respective blocking diodes 8 and 8' connected to the ends of the primary windings 16a, 16b. The inverter transformer additionally includes two secondary windings 17, 18. Connected across one of these secondary windings 17 are the A.C. loads 19 supplied by the inverter. Connected across the other secondary winding 18 are a threshold voltage time relay 20 and a time relay 21.

The time relay 21 includes two normally open contacts 21' and 21". Both of these contacts close immediately when the relay 21 is energized but one of these normally open contacts 21' opens with a time delay during the turn-off process for the inverter circuit. The time-delayed normally open contact 21' is connected in series with the relay 3, and the non-delayed normally open contact 21" is connected in series with a relay 22. This relay 22 has a normally open contact 22' which is closed with a time delay when the relay 22 is energized during the turn-on process for the inverter circuit. This normally open contact 22' is connected in series with a start-up resistance bridging relay 23 having a normally open contact 23' which is connected across or in parallel with the start-up resistor 4.

The threshold voltage time relay 20 includes a normally closed contact 20' which is opened with a time delay when the relay 20 is energized during the start-up process for the inverter circuit. This normally closed contact 20' is connected in series with an auxiliary relay 24 across the output terminals of a voltage detecting voltage source unit 25. The auxiliary relay 24 includes a normally open contact 24' connected between an on-board d.c. battery 26 and the input of an auxiliary inverter 26. The output of this auxiliary inverter 26 is connected to a rectifier bridge 27 whose output is connected, via a current limiting resistor 28, with the input of the inverter circuit.

Operation of the Inverter Circuit

If a mains voltage is applied to the circuit of FIG. 1 via the rectifier 1, this mains voltage is detected by the voltage detecting/voltage source 25 causing it to produce an output voltage. This output voltage is applied to the auxiliary relay 24 via the normally closed contact 20' of the threshold voltage time relay 20, causing the relay 24 to be energized and the normally open contact 24' of the auxiliary relay 24 to close. This results in the inverter circuit being supplied with an auxiliary voltage from the on-board battery via the circuits 26 and 27 and the inverter circuit begins to operate. After a short time, the secondary winding 18 provides a voltage at a certain level and the threshold voltage time relay 20 and the time relay 21 are charged with a sufficient voltage and energized. The time relay 21 closes its normally open contact 21', causing relay 3 to be supplied with voltage and close its normally open contact 3'. Via the start-up resistor 4, the inverter circuit is now provided with a voltage from the mains which is greater than the auxiliary voltage supplied by the on-board battery. Since, as mentioned above, the threshold voltage time relay 20 opens its normally closed contact 20' with a time delay, the on-board battery is separated from the inverter by the auxiliary relay 24, likewise with a time delay. Simultaneously with the energization of the relay 3, the closing of the contact 21" of the time relay 21 also charges the relay 22 with voltage, causing the relay 22 to close its normally open contact 22' with a time delay. When the normally open contact 22' closes, the start-up resistance bridging relay 23 is charged with a voltage causing its contact 23' to close and short-circuit the start-up resistor 4. The start-up of the inverter circuit is thus completed.

The following different cases of malfunction will now be discussed:

Case 1

It is assumed that the mains voltage has a voltage level which would destroy the presently nonconductive thyristors 9 in the positive reverse voltage direction. This is shown in FIG. 3. It is further assumed that each one of the two thyristors 9 has an inverse voltage of 1200 V and the mains voltage is assumed to be 2500 V. Thus a voltage of 1250 V would appear across each thyristor 9 which would lead to the destruction of these thyristors. Since the two breakdown diodes 15 each have a breakdown voltage of 1000 V, the two breakdown diodes 15 for the thyristors 9 will become conductive when the mains voltage reaches a voltage level of 2000 V. Thus, the two thyristors 9 which presently are not conductive are fired and change to the conductive state. Since now all four thyristors 9 and 9' are in the conductive state, the secondary winding 18 of the inverter transformer no longer furnishes an output voltage. Thus, the threshold voltage time relay 20 and the time relay 21 no longer carry current and are de-energized. The inverter input current is limited by the limiting resistor 5 in such a manner that the maximum thyristor current for each thyristor 9 or 9' is not exceeded. De-energization of the time relay 21 causes its not time delayed contact 21" to immediately open so that the relay 22 no longer receives current. This causes the contacts 22' to open and thus the start-up resistance bridging relay 23 becomes de-energized and the start-up resistor 4 becomes effective. If the mains voltage continues to remain at this high value, the thyristors 9' shown on the right in FIG. 1 are first blocked by means of the commutation capacitor 11 and immediately fired again by their associated blocking diodes 14. A short-circuit current develops and, since the time-delayed normally open contact 21' of the time relay 21 is now open, the relay 3 opens its contact 3' and disconnects the inverter circuit from the mains. Thereafter, as described above, the inverter circuit is put back into operation.

If, however, during use of the start-up resistor 4, the mains voltage drops back (mains voltage lower than twice the inverse voltage), the thyristors 9' shown on the right in FIG. 1 go into the reversing state and the inverter circuit changes to its normal operating state. This causes the secondary winding 18 of the inverter transformer to again emit a voltage, and thus the time relay 21 is again charged with a voltage and, via the contact 22' and the relay 23, the start-up resistor 4 is short-circuited again with a time delay.

Case 2

It is now assumed that a short-circuit would occur on the secondary side of the inverter transformer and that the thyristors 9' shown on the right in FIG. 1 are in the conductive state. The short-circuit would thus produce a significant change in current (di/dt) in one partial winding 16b of the primary winding of the inverter transformer. This change in current has the result that a high induction voltage would develop in the one partial winding 16a of the primary winding of the inverter transformer [w·(di/dt)]. This high voltage would appear across the thyristors 9, which are not in the conductive state (in FIG. 1, the thyristors on the left) and would destroy the thyristors (positive inverse voltage). The breakdown diodes 15 take care in this case as well, that the thyristors 9 shown on the left of FIG. 1 are fired and that the entire inverter circuit is either switched off or put out of operation only for a short time if the short circuit is only temporary.

Case 3

It is now assumed that an interference pulse fires a momentarily nonconductive thyristor 9 or 9' and the mains voltage has a level of 1500 V. In this case, if the breakdown diode 15 did not exist, the full voltage of 1500 V would appear across the nonconductive thyristor 9 and would destroy it. However, the associated breakdown diode 15, as soon as the voltage across the thyristor 9 exceeds 1000 V, fires the respective thyristor 9 or 9'. This again produces a temporary short-circuit so that the inverter circuit is put out of operation or switched off only temporarily.

Case 4

It is now assumed that a thyristor 9 or 9' is not actuated because of a firing delay. This would bring too high a voltage to the other thyristor 9 or 9' connected in series therewith. In this case as well, the latter thyristor 9 or 9' is actuated by its associated breakdown diode 15.

FIG. 2 shows that the control grids of the thyristors 9, which are to go into the blocking range, are charged with a negative bias, i.e. 0.6 V, compared to the cathode of the thyristors 9. This constitutes a positive influence on the dynamic behavior of the thyristors 9 (blocking direction time behavior).

It will be understood that the above description of the present invention is susceptible to various modifications, changes and adaptations, and the same are intended to be comprehended within the meaning and range of equivalents of the appended claims.

What is claimed is:

1. In an energy supply device for supplying energy to useful loads in a rail-bound vehicle from railroad networks carrying alternating voltages at different levels, said device including a thyristor static inverter circuit having an output transformer and with each thyristor of said inverter circuit being provided with an excess inverse voltage protection circuit (CR-R member) which is connected in parallel with the associated thyristor, and a rectifier circuit and the normally open contact of a first relay connected in series between an input connectable to the railroad mains and the input to said inverter circuit; the improvement comprising, in combination: a respective series connection of a resistor and a decoupling blocking diode connected in parallel with each said excess inverse voltage protection circuit with the anode of said decoupling blocking diode being connected with the cathode of the associated said thrystor; a respective breakdown diode connected between the control grid of each said thyristor and the cathode of the associated said decoupling blocking diode, with said breakdown diode being disposed in the breakdown direction with respect to said control grid of the associated said thyristor; and a voltage sensor means, connected to the secondary of said transformer, for controlling said first relay to open its said contact if there is a break or collapse of the secondary voltage of said transformer, thereby separating said inverted circuit from the railroad mains, said voltage sensor means including a time relay having a coil and a normally open contact which opens with a time delay, said coil of said time relay being connected across a secondary winding of said inverter transformer, and said normally open contact of said time relay being connected in series with the coil of said first relay.

2. An energy supply device as defined in claim 1 further comprising: a start-up resistor connected in series between said contact of said first relay and said input of said inverter circuit; a bridging relay having a normally open contact, which is connected across said start-up resistor, and a coil; a second relay having a coil and a normally open contact which closes with a time delay, said contact of said second relay being connected in series with said coil of said bridging relay across a source of d.c. potential; and circuit means responsive to the secondary voltage of said inverter transformer for controlling said coil of said second relay.

3. An energy supply device as defined in claim 2 or 5 wherein said circuit means includes a second normally open contact for said first relay with said second contact connecting said coil of said second relay across a source of d.c. potential.

4. An energy supply device as defined in claim 1 further comprising: a rectifier bridge having its output connected to said input of said inverter circuit; an auxiliary inverter circuit connected to the input of said rectifier bridge; a battery; an auxiliary relay having a normally open contact connected between said battery and the input of said auxiliary inverter circuit, and a coil; means for detecting the mains voltage at the output of said rectifier circuit and for producing an output voltage when the mains voltage is below a given value; a threshold voltage time relay having a coil connected across a secondary winding of said inverter transformer, and a normally closed contact which opens with a time delay; and said normally closed contact of said threshold voltage time relay is connected in series with said coil of said auxiliary relay across the output of said means for detecting.

5. In an energy supply device for supplying energy to useful loads in a rail-bound vehicle from railroad networks carrying alternating voltages at different levels, said device including a thyristor static inverter circuit having an output transformer and with each thyristor of said inverter circuit being provided with an excess inverse voltage protection circuit (CR-R member) which is connected in parallel with the associated thyristor, and a rectifier circuit and the normally open contact of a first relay connected in series between an input connectable to the railroad mains and the input to said inverter circuit; the improvement comprising, in combination: a respective series connection of a resistor and a decoupling blocking diode connected in parallel with each said excess inverse voltage protection circuit with the anode of said decoupling blocking diode being connected with the cathode of the associated said thyristor; a respective breakdown diode connected between the control grid of each said thyristor and the cathode of the associated said decoupling blocking diode, with said breakdown diode being disposed in the breakdown direction with respect to said control grid of the associated said thyristor; a voltage sensor means, connected to the secondary of said transformer, for controlling said first relay to open its said contact if there is a break or collapse of the secondary voltage of said transformer, thereby separating said inverted circuit from the railroad mains; a start-up resistor connected in series between said contact of said first relay and said input of said input inverter circuit; a bridging relay having a normally open contact, which is connected across said start-up resistor, and a coil; a second relay having a coil and a normally open contact which closes with a time delay, said contact of said second relay being connected in series with said coil of said bridging relay across a source of d.c. potential; and, circuit means responsive to the secondary voltage of said inverter transformer for controlling said coil of said second relay.

6. In an energy supply device for supplying energy to useful loads in a rail-bound vehicle from railroad networks carrying alternating voltages at different levels, said device including a thyristor static inverter circuit having an output transformer and with each thyristor of said inverter circuit being provided with an excess inverse voltage protection circuit (CR-R member) which is connected in parallel with the associated thyristor, and a rectifier circuit and the normally open contact of a first relay connected in series between an input connectable to the railroad mains and the input to said inverter circuit; the improvement comprising, in combination: a respective series connection of a resistor and a decoupling blocking diode connected in parallel with each said excess inverse voltage protection circuit with the anode of said decoupling blocking diode being connected with the cathode of the associated said thyristor; a respective breakdown diode connected between the control grid of each said thyristor and the cathode of the associated said decoupling blocking diode, with said breakdown diode being disposed in the breakdown direction with respect to said control grid of the associated said thyristor; a voltage sensor means, connected to the secondary of said transformer, for controlling said first relay to open its said contact if there is a break or collapse of the secondary voltage of said transformer, thereby separating said inverted circuit from the railroad mains; a rectifier bridge having its output connect to said input of said inverter circuit; an auxiliary inverter circuit connected to the input of said rectifier bridge; a battery; an auxiliary relay having a normally open contact connected between said battery and the input of said auxiliary inverter circuit, and a coil; means for detecting the mains voltage at the output of said rectifier circuit and for producing an output voltage when the mains voltage is below a given value; and a threshold voltage time relay having a coil connected across a secondary winding of said inverter transformer, and a normally closed contact which opens with a time delay, said normally closed contact of said threshold voltage time relay being connected in series with said coil of said auxiliary relay across the output of said means for detecting.

* * * * *